United States Patent
Noto

[19]

[11] Patent Number: 5,854,480
[45] Date of Patent: Dec. 29, 1998

[54] TAG WITH IC CAPACITIVELY COUPLED TO ANTENNA

[75] Inventor: Hiroyuki Noto, Tokyo, Japan

[73] Assignee: Oki Electric Indusry Co., Ltd., Tokyo, Japan

[21] Appl. No.: 678,099

[22] Filed: Jul. 11, 1996

[30] Foreign Application Priority Data

Jul. 18, 1995 [JP] Japan ................................. 7-181518

[51] Int. Cl.⁶ ............................................. G06K 19/06
[52] U.S. Cl. .......................... 235/492; 235/491; 235/451
[58] Field of Search .................... 235/492, 491, 235/451; 343/744

[56] References Cited

U.S. PATENT DOCUMENTS

| | | | |
|---|---|---|---|
| 3,699,311 | 10/1972 | Dunbar | 235/451 |
| 4,816,654 | 3/1989 | Anderl et al. | 235/492 |
| 4,947,180 | 8/1990 | Schotz | 343/744 |
| 5,175,418 | 12/1992 | Tanaka | 235/451 |
| 5,400,039 | 3/1995 | Araki et al. | 343/760 |
| 5,448,249 | 9/1995 | Kushihi et al. | 343/700 |
| 5,598,032 | 1/1997 | Fidalgo | 235/492 |

FOREIGN PATENT DOCUMENTS

| | | |
|---|---|---|
| 0585132 | 3/1994 | European Pat. Off. . |
| 6282699 | 10/1994 | Japan ................. 235/492 |
| WO 92/22827 | 12/1996 | WIPO . |

OTHER PUBLICATIONS

Epoque Abstract re JP 7306265 (Chikusanyo Denshi Gijutsu Kenkyu Kumiai).

*Primary Examiner*—Anita Pellman Gross
*Assistant Examiner*—Mark Tremblay
*Attorney, Agent, or Firm*—Jones & Volentine, L.L.P.

[57] ABSTRACT

A tag has an integrated circuit (IC), electrode plates included in the IC, an electrically insulating film covering the electrode plates, antenna terminals each facing one of the electrode plates with the insulating film sandwiched between, antennas each being connected to one of the antenna terminals, and packings.

12 Claims, 5 Drawing Sheets

TAG WITH IC CAPACITIVELY COUPLED TO ANTENNA

BACKGROUND OF THE INVENTION

1. Field of the Invention

The present invention relates to a tag device storing information relating to, e.g., the kind and cost of an article of commerce, and for transmitting a signal based on the information in response to an electromagnetic wave received from an interrogator, and a method of producing the same.

2. Description of the Background Art

EP Publication 0 585 132 A1, for example, discloses a transponder of the type receiving an electromagnetic wave from an interrogator with antennas, causing its response circuit to output information in response to the received wave, and sending the information to the interrogator via the antennas. Power supply for the response circuit is implemented by the power of the received electromagnetic wave. When the transponder receives the electromagnetic wave from the interrogator with its antennas, a power supply circuit transforms the power of the received wave to DC power and feeds it to the response circuit, thereby enabling it. The response circuit demodulates a signal received from the interrogator, analyzes it, and then outputs information stored in the response circuit. The output of the response circuit is routed through a coupling capacitor to the antennas. As a result, the information is transmitted to the interrogator via the antennas.

The response circuit and power supply circuit are formed on a semiconductor chip in the form of a generally flat integrated circuit (IC). The IC is connected to the antennas by wires. Each of the antennas also has a generally flat configuration and and extends outward in a plane containing the flat IC. The entire IC including the antennas is sandwiched between two packings at its opposite major surfaces and sealed thereby. The packings are each formed of resin and also provided with a flat configuration. The resulting assembly constitutes a tag device which may be attached to, e.g., an article of commerce in order to send information to an interrogator, as stated earlier.

The conventional tag device described above has some problems left unsolved, as follows. The wires and antennas or the wires and connection terminals of the IC are connected by wire bonding. Wire bonding is apt to result in defective connection due to shocks and impacts which often act on the tag on the production line and at the time of use. Moreover, wire bonding needs high accuracy and thereby complicates the production steps.

SUMMARY OF THE INVENTION

It is therefore an object of the present invention to provide a tag device substantially free from faults ascribable to defective connection and highly durable and reliable.

It is another object of the present invention to provide a method of producing a tag device and including a minimum of complicated procedure.

In accordance with the present invention, in a tag device having a generally flat IC device including a response circuit for storing information and for outputting a signal based on the information, and an antenna, a generally flat electrode plate is positioned on a major surface of the IC device and connected to the response circuit. A generally flat antenna terminal is connected to the antenna and faces the electrode plate at a preselected distance.

Also, in accordance with the present invention, a method of producing a tag device includes the step of forming a generally flat antenna terminal on a first packing. An IC device is prepared which includes a response circuit for storing information and for outputting a signal based on the information, a generally flat electrode plate, and an electrically insulating film covering the electrode plate. The IC device is placed on the antenna terminal such that the antenna terminal and electrode plate face each other. A second packing is placed on the IC device. Finally, the first and second packings are adhered to each other.

Also, in accordance with the present invention, a method of producing a tag device includes the step of forming a generally flat antenna terminal on a first packing. A dielectric layer is formed on the antenna terminal. An IC device is prepared which includes a response circuit for storing information and for outputting a signal based on the information, a generally flat electrode plate, and an electrically insulating film covering the electrode plate. The IC device is placed on the dielectric layer such that the antenna terminal and electrode plate face each other. A second packing is placed on the IC device. Finally, the first and packings are adhered to each other.

Further, in accordance with the present invention, a method of producing a tag device includes the step of preparing an IC device including a response circuit for storing information and for outputting a signal based on the information, a generally flat electrode plate, and an electrically insulating film covering the electrode plate. The IC device is placed on a first packing with the electrode plate facing upward. A generally flat antenna terminal is formed on the IC device such that the antenna terminal faces the electrode plate. A second packing is placed on the antenna terminal. Finally, the first and second packings are connected to each other around the IC device.

Furthermore, in accordance with the present invention, a method of producing a tag device includes the step of preparing an IC device including a response circuit for storing information and for outputting a signal based on the information, a generally flat electrode plate, and an electrically insulating film covering the electrode plate. The IC device is placed on a first packing with the electrode plate facing upward. A dielectric layer is formed on the electrode plate. A generally flat antenna terminal is formed on the dielectric layer such that the antenna terminal faces the electrode plate. A second packing is placed on the antenna terminal. Finally, the first and second packings are adhered to each other around the IC device.

Moreover, in accordance with the present invention, a method of producing a tag device includes the step of forming a first generally flat antenna terminal on a first packing. An IC device is prepared which includes a first generally flat electrode plate provided on one of opposite major surfaces of a semiconductor substrate, a second generally flat electrode plate provided on the other major surface of the semiconductor substrate, an electrically insulating film covering the first and second electrode plates, and a response circuit for storing information and for outputting a signal based on the information. The IC device is placed on the first antenna terminal such that the first antenna terminal and first electrode plate face each other. A second generally flat antenna terminal is formed on the IC device such that the second antenna terminal faces the second electrode plate. A second packing is placed on the second antenna terminal. Finally, the first and second packings are adhered to each other around the IC device.

In addition, in accordance with the present invention, a method of producing a tag device includes the step of forming a first generally flat antenna terminal on a first packing. A first dielectric layer is formed on the first antenna terminal. An IC device is prepared which includes a first generally flat electrode plate provided on one of opposite major surfaces of a semiconductor substrate, a second generally flat electrode plate provided on the other major surface of the semiconductor substrate, an electrically insulating film covering the first and second electrode plates, and a response circuit for storing information and for outputting a signal based on the information. The IC device is placed on the first dielectric layer such that the first antenna terminal and first electrode plate face each other. A second dielectric layer is formed on the IC device. A second generally flat antenna terminal is formed on the second dielectric layer such that the second antenna terminal faces the second electrode plate. The second packing is placed on the second antenna terminal. Finally the first and second packings are adhered to each other around the IC device.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
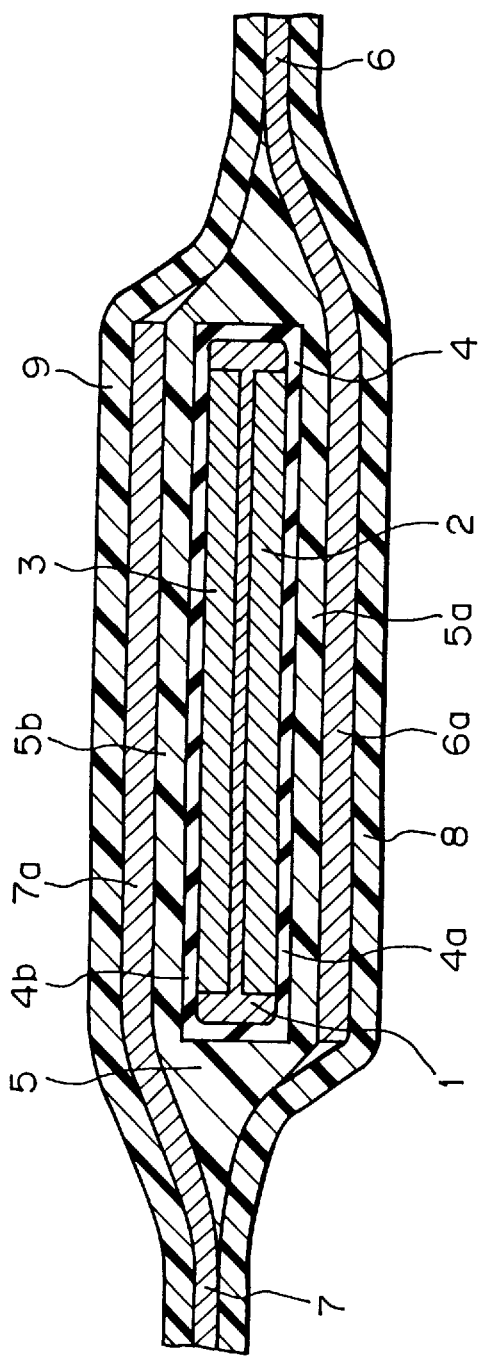
FIG. 1 is a sectional view showing a tag device embodying the present invention.

Referring to FIG. 1 of the drawings, a tag device embodying the present invention is shown. As shown, the tag device has an IC device 1 storing information relating to, e.g., the kind, cost and so forth of an article of commerce to which the tag device is attached. In response to an electromagnetic wave received from an interrogator, not shown, the IC device 1 sends a signal based on the stored information to the interrogator. The IC device 1 is made up of a generally flat substrate formed of an insulating material, and electric circuitry (see FIG. 2) arranged on the substrate.

Generally flat electrode plates 2 and 3 are respectively provided on opposite major surfaces of the substrate of the IC device 1, as illustrated. An electrically insulating film 4 covers the entire periphery of the IC device 1 and electrode plates 2 and 3. The electrode plates 2 and 3 may be implemented as, e.g., electrically conductive semiconductor layers formed on the substrate of the IC device 1. For the conductive semiconductor layers, use may be made of, but not limited to, polycrystalline silicon having a high impurity content. The conductive semiconductor layers may be replaced with aluminum layers, if desired. The insulating film 4 is implemented by, e.g., a silicon oxide film, a silicon nitride film, or a laminate of the two films.

The insulating film 4 has a lower oxide film 4a and an upper oxide film 4b. A dielectric layer 5 encloses the insulating film 4 and has a lower layer 5a and an upper layer 5b. Generally flat antenna terminals 6a and 7a respectively face the electrode plates 2 and 3 with the intermediary of the insulating film 4 and dielectric layer 5. Antennas 6 and 7 are connected to the antenna terminals 6a and 7a, respectively. The dielectric layer 5 sets up a capacity between the electrode plates 2 and 3 and the antenna terminals 6a and 7a. The dielectric layer 5 may be formed of a polymer dielectric substance, e.g., polyethylene terephthalate, polypropyrene or polystyrol. The dielectric layer 5 has a dielectric constant usually ranging from 2 to 4, and a thickness generally smaller than several microns. The antenna terminals 6a and 7a are aluminum layers formed on the dielectric layer 5 by vapor deposition, or copper, tungsten or similar metal patterned on the layer 5 by a printing technology. This kind of metal is usually adapted for the wiring of printed circuit boards. While the antenna terminals 6a and 6b and antenna 6 and 7 are formed of the same material as and integrally with each other in the embodiment, the antenna 6 and 7 and the antenna terminals 6a and 7a may each be formed of a particular material. A packing 8 covers the outer periphery of the antenna terminal 6a and antenna 6. Likewise, a packing 9 covers the outer periphery of the antenna terminal 7a and antenna 7. The packings 8 and 9, like the dielectric layer 5, may be formed of polyethylene terephthalate, polypropyrene or polystyrol by way of example.

Figure 2:
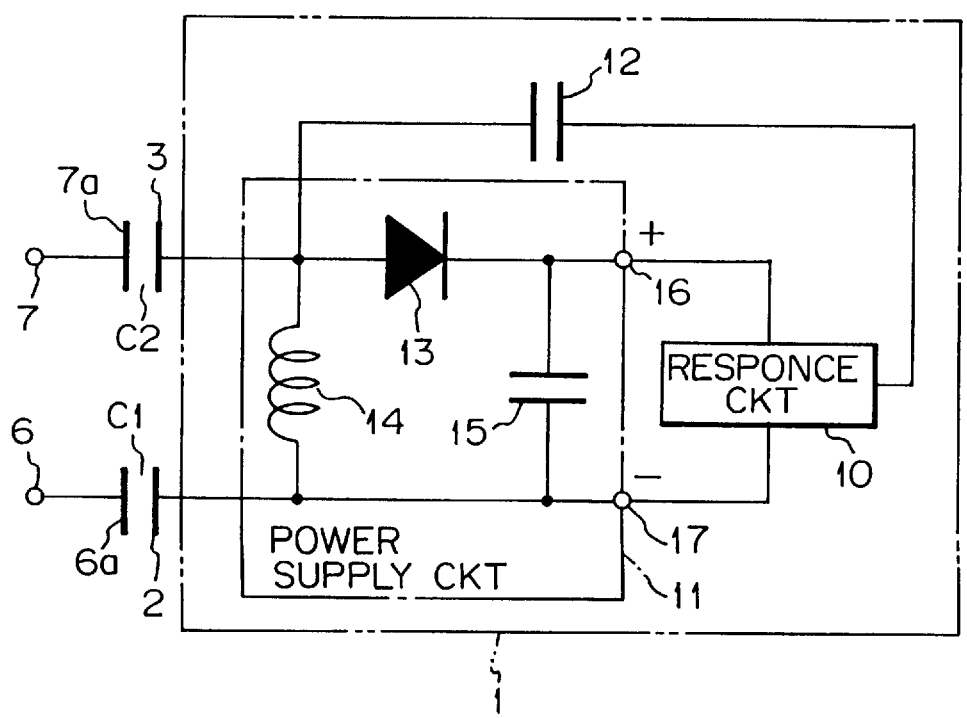
FIG. 2 shows an equivalent circuit to an IC device included in the embodiment shown in FIG. 1.

FIG. 2 is an equivalent circuit diagram representative of the tag device shown in FIG. 1. As shown, the electrode plate 2 and antenna terminal 6a constitute a capacitor C1 in combination. Likewise, the electrode plate 3 and antenna terminal 7a constitute another capacitor C2. The IC device 1 is made up of a response circuit 10, a power supply circuit 11, and a coupling capacitor 12. The response circuit 10 stores the previously mentioned information and outputs them, as needed. The power supply circuit 11 feeds power to the response circuit 10. The coupling capacitor 12 delivers a signal based on the information output from the response circuit 10 to the antenna 7. The power supply circuit 11 has a diode 13 having its anode connected to the electrode plate 3, a flywheel inductor 14, and a smoothing capacitor 15. The flywheel inductor 14 passes a pulsation derived from the rectification of the diode 13 therethrough. The smoothing capacitor 15 stores power therein.

The circuit shown in FIG. 2 will be operated as follows. An electromagnetic wave sent from the interrogator, not shown, is received by the antennas 6 and 7 and generates an AC electromotive force between the antenna terminals 6a and 7a. The electromotive force is applied to both ends of the flywheel inductor 14 via the electrode plates 3 and 2. The electromotive force is rectified by the diode 13 and then smoothed by the smoothing capacitor 15. As a result, a positive (+) and a negative (−) DC voltage respectively appear on terminals 16 and 17 and enable or activate the response circuit 10. In response, the response circuit 10 demodulates the received signal, analyzes the demodulated signal, and then outputs the stored information. The information is delivered to the antenna 7 via the coupling capacitor 12 and the capacitor C2 constituted by the electrode plate 3 and antenna terminal 7a. Consequently, the information is radiated from the antenna 7 toward the interrogator as an electromagnetic wave.

As stated above, in the illustrative embodiment, the antennas 6 and 7 are electrically connected to the IC device 1 by the capacitors C1 and C2, respectively. The capacitors C1 and C2 are respectively constituted by the antenna terminal and electrode plate 2 and by the antenna terminal and electrode plate 3. This obviates the need for wire bonding customarily used for connecting antennas and an IC circuit device. The embodiment is therefore free from faults ascribable to defective wire bonding.

Further, in the embodiment, the electrode plates 2 and 3 are respectively laminated on both major surfaces of the IC device 1 by using them efficiently. Therefore, even when the IC device 1 is relatively small size, the structure of the embodiment is practicable.

In addition, the dielectric layer 5 intervenes between the electrode plate 2 and the antenna terminal 6a and between the electrode plate 3 and the antenna terminal 7a. Hence, the thickness of the insulating film 4 can be reduced, compared to the case where the dielectric layer 5 is absent. Hence, the capacitors C1 and C2 respectively constituted by the electrode plate 2 and antenna terminal 6a and the electrode plate 3 and antenna terminal 7a can have their coupling capacitances increased. It is to be noted that the dielectric layer 5 is omissible if the coupling capacitances of the capacitors C1 and C2 implemented by the insulating film 4 are sufficiently great.

In the above embodiment, the electrode plates 2 and 3 are provided on both major surfaces of the IC device 1. Alternatively, the electrode plates 2 and 3 may be positioned on only one of the opposite major surfaces of the IC device 1, in which case the antennas 6a and 7a will face the plates 2 and 3 at the above one major surface of the device 1.

FIGS. 3A–3F are plan views demonstrating the general procedure for producing the tag device shown in FIG. 1. In FIGS. 3A–3F, the antennas 6 and 7 are not shown because they are assumed to be formed integrally with the antenna terminals 6a and 7a, respectively. The shapes of the packings 8 and 9 as well as other constituent parts shown in FIGS. 3A–3F are only illustrative.

Figure 3A:
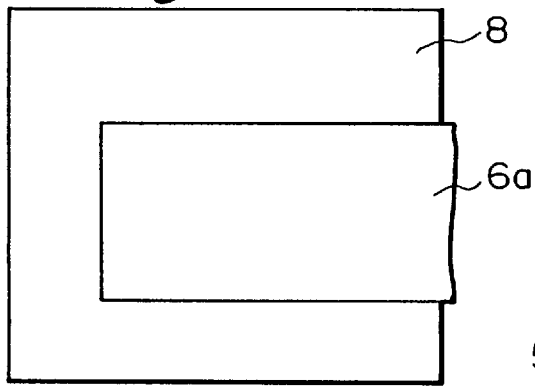
FIGS. 3A–3F are plan views demonstrating a sequence of steps for producing the tag device shown in FIG. 1.

As shown in FIG. 3A, the procedure begins with a step of forming the antenna 6 and antenna terminal 6a on the packing 8. Specifically, the antenna 6 and antenna terminal 6a are formed by, e.g., the vapor deposition of aluminum. Alternatively, the antenna 6 and antenna terminal 6a may be formed by an intaglio printing technology using electrically conductive ink and copper, tungsten or similar metal. Further, the antenna 6 and antenna terminal 6a may each be implemented as an electrically conductive film placed on or adhered to the packing 8.

Figure 3D:
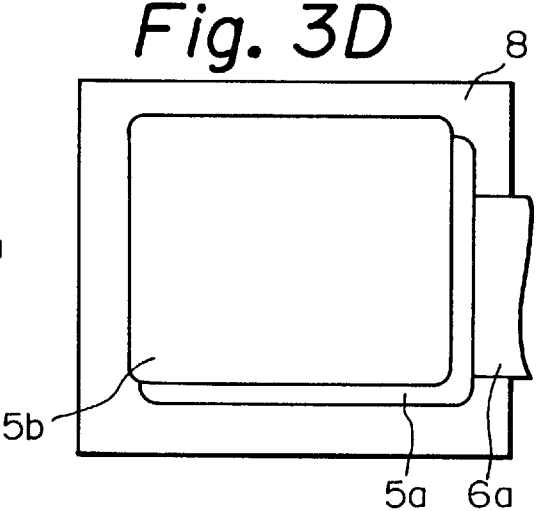
Figure 3B:
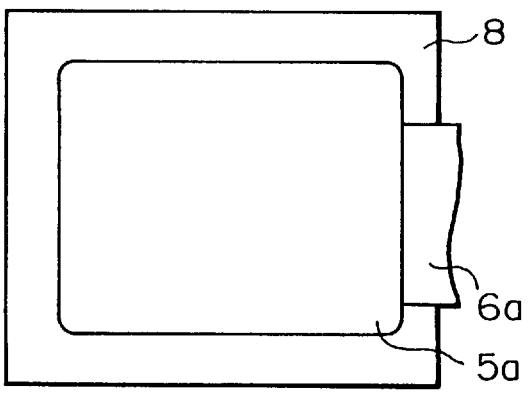

As shown in FIG. 3B, the lower layer 5a of the dielectric layer 5 is formed on the packing 8 in such a manner as to cover the antenna terminal 6a. To form the lower layer 5a, a polymer dielectric substance may be deposited on the packing 8 over the antenna terminal 6a by printing. Alternatively, a film of polymer conductive substance may be placed on or adhered to the packing 8 over the antenna terminal 6a.

Figure 3E:
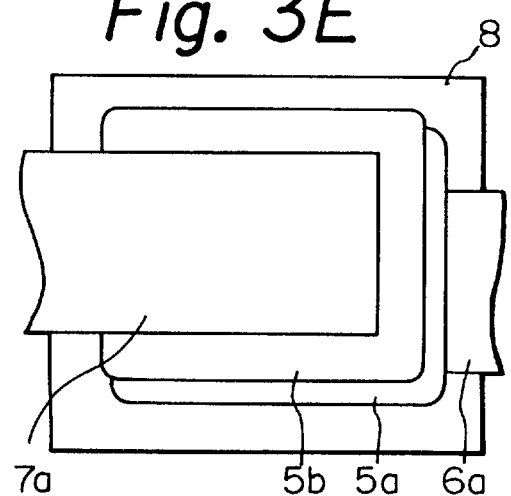
Figure 3C:
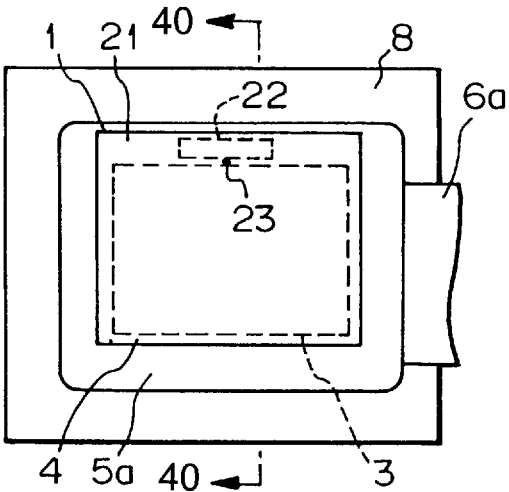

As shown in FIG. 3C, the IC device 1 is placed on the lower layer 5a of the dielectric layer 5. As shown in FIG. 1, the electrode plates 2 and 3 and insulating film 4 (not shown in FIG. 3C) are laminated on the IC device 1 beforehand. The insulating layer 4 of the IC device 1 may be adhered to the lower layer 5a, if desired. As shown in FIG. 3C, the IC device 1 has a p type substrate 21, electric circuitry 22 arranged on the substrate 21, and a wiring pattern 23 interconnecting the circuitry 22 and electrode plate 3. A procedure for fabricating the IC device 1 with the electrode plates 2 and 4 and insulating film 4 will be described later with reference to FIGS. 4A–4N.

Subsequently, as shown in FIG. 3D, the upper layer 5b of the dielectric layer 5 is formed on the packing 8 in such a manner as to cover the entire IC device 1. To form the upper layer 5b, a polymer dielectric layer may be deposited on the packing 8 over the IC device 1 by printing, or a film of polymer substance may be placed on or adhered to the antenna terminal 6a.

As shown in FIG. 3E, the antenna 7 and antenna terminal 7a are formed on the upper layer 5b of the dielectric layer 5. The antenna 7 and antenna terminal 7a are formed of the same material as and by the same method as the antenna 6 and antenna terminal 6a.

Figure 3F:
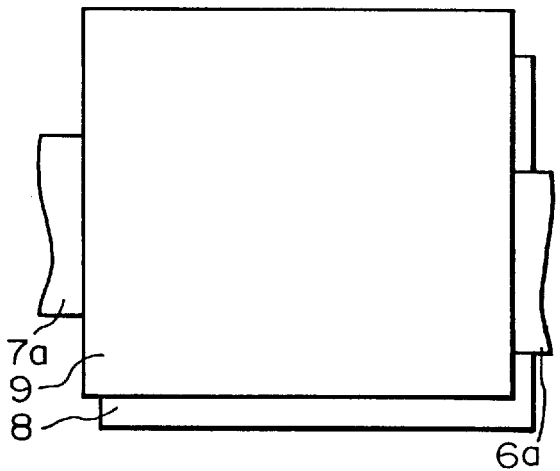

As shown in FIG. 3F, the other packing 9 is placed on the antenna terminal 7a shown in FIG. 3E. The two packings 8 and 9 are connected together around the IC device 1 by welding or by use of adhesive.

Figure 4A:
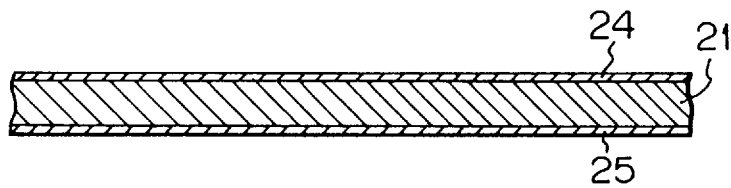
FIGS. 4A–4N are sections useful for understanding a specific procedure for producing the IC device at the stage shown in FIG. 3C.

In the condition shown in FIG. 3C, the electrode plates 2 and 3 and insulating film 4 are produced by a specific procedure which will be described with reference to FIGS. 4A–4N. FIGS. 4A–4N are sections of the IC device 1 along line 40—40 of FIG. 3C.

Figure 4B:
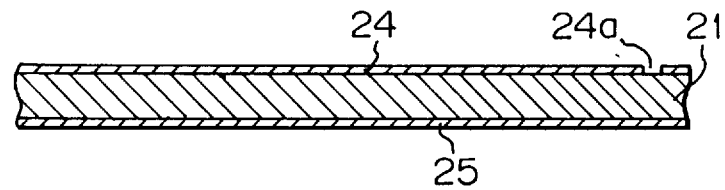
Figure 4C:
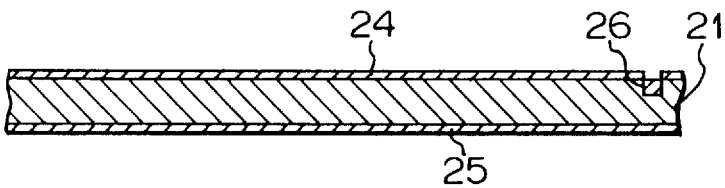
Figure 4D:
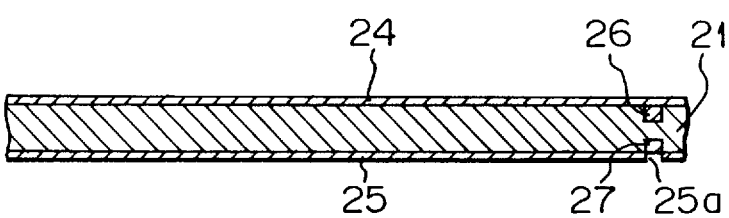
Figure 4E:
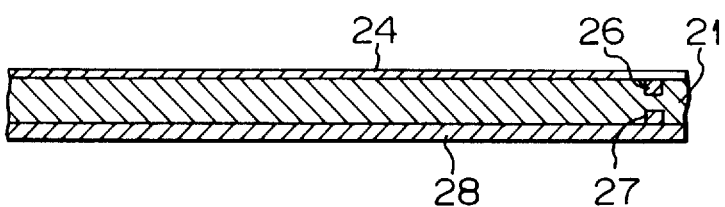
Figure 4F:
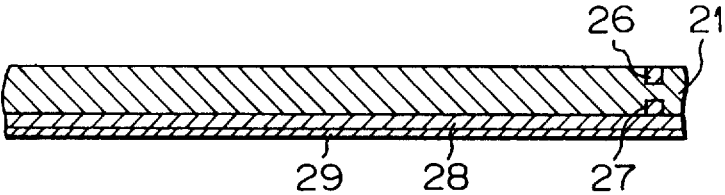
Figure 4G:
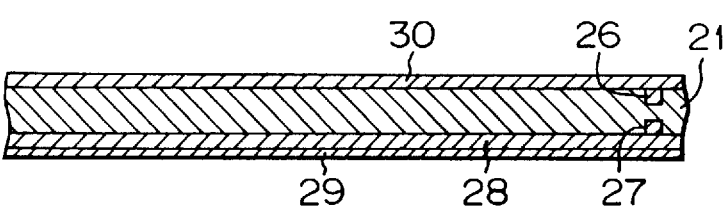

First, as shown in FIGS. 4A–4C, oxide films 24 and 25 are respectively formed on the front and rear major surfaces of the p type substrate 1 included in the IC device 1. A part 24a of the oxide film 24 on the front is removed so as to exposed the substrate 21 to the outside. An impurity is injected into the substrate 21 via the removed part 24a in order to form an $n^+$ diffused region 26. Then, the removed part 24a of the oxide film 24 is closed by a new oxide film. Likewise, as shown in FIG. 4D, a part of the oxide film 25 on the rear of the substrate 1 is removed so as to exposed the substrate 21 to the outside. An $n^+$ diffused region 27 is formed in this rear exposed part of the substrate 21 by ion injection. Subsequently, as shown in FIG. 4E, the rear oxide film 25 is removed from the substrate 1, and then an $n^-$ layer 28 is formed on the rear of the substrate 21 by epitaxial growth. As shown in FIG. 4F, an oxide film 29 is formed on the $n^-$ layer 28, and the front oxide film 24 is removed. Then, as shown in FIG. 4G, an $n^-$ layer 30 is formed on the front of the substrate 21 by epitaxial growth 21.

Figure 4H:
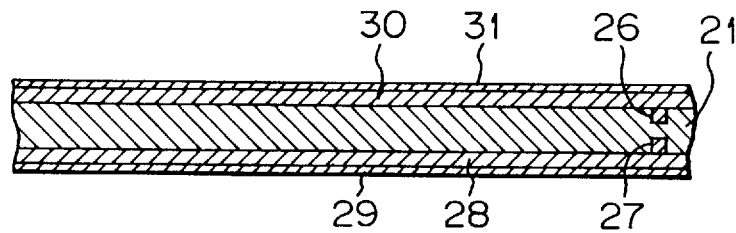
Figure 4I:
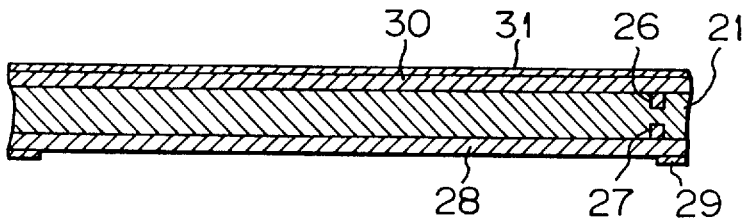
Figure 4J:
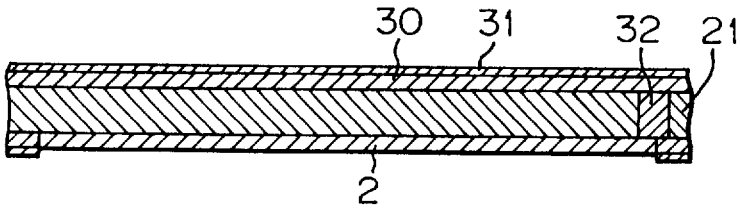
Figure 4K:
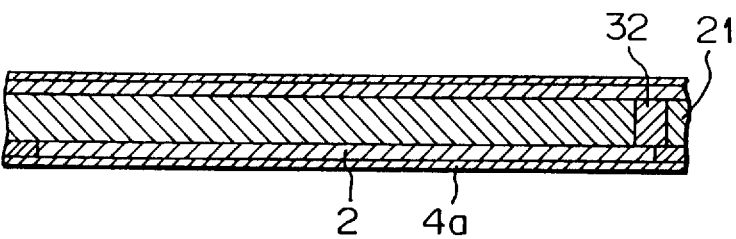
Figure 4L:
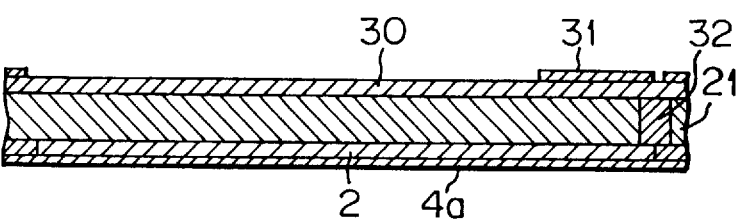
Figure 4M:
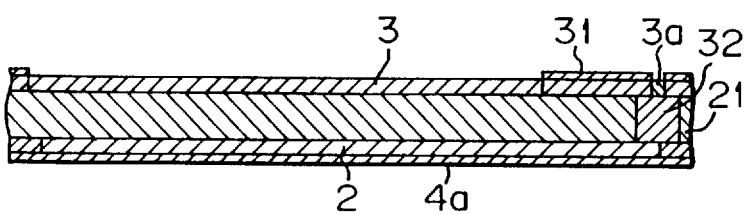
Figure 4N:
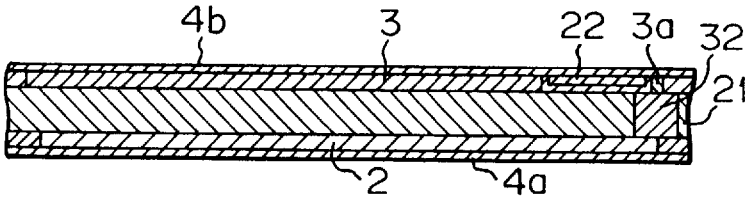

As shown in FIGS. 4H and 4I, an oxide film 31 is formed on the above $n^-$ layer 30, and the rear oxide film 29 is removed over a preselected range for forming the electrode plate 2. Subsequently, as shown in FIG. 4J, the $n^-$ layer 28 is transformed to an $N^+$ lower electrode plate 2 by ion injection while the $n^+$ diffused layer 27 is caused to glow. As a result, an $n^+$ diffused portion 32 is formed which extends throughout the substrate 21. As shown in FIGS. 4K and 4L, the lower oxide film 4a of the insulating film 4 is formed on the lower electrode plate 2. As the same time, the upper oxide film 31 is removed over two preselected ranges for forming the electrode plate 3 and an electrode portion 3a, respectively. Subsequently, as shown in FIG. 4M, the $n^-$ layer 30 is partly transformed to the $n^+$ lower electrode plate 3 and electrode portion 3a by ion injection while the $n^+$ diffused portion 32 is caused to glow. Finally, as shown in FIG. 4N, the electric circuitry 22 of the IC device 1 and the upper oxide layer 4b are sequentially formed in this order.

It will be seen from the above that the sequence of steps of the illustrative embodiment do not include wire bonding needing high accuracy and are therefore simple.

In FIGS. 3A–4N, while the electrode plates 2 and 3 are respectively provided on opposite major surfaces of the IC device 1, such a configuration is only illustrative. Alternatively, the electrode 3 and antenna terminal 7a may be formed only on the upper major surface of the IC device 1. To implement this alternative configuration, there should only be performed a sequence of steps of placing the IC device 1 on the packing 8 with the electrode plate 3 facing upward, as viewed in FIGS. 3A–4N, forming the dielectric layer 5 on the IC device 1, forming the antenna terminal 7a on the dielectric layer 5, placing the antenna terminal 7a on the antenna terminal 7a, and adhering the packings 8 and 9. Further, the electrode plate 2 and antenna terminal 6a may be formed only on the underside of the IC device 1. This can be done by forming the antenna terminal 6a on the packing 8, forming the dielectric layer 5 on the antenna terminal 6a, placing the IC device 1 on the dielectric layer 5 with the electrode plate 2 facing downward, as viewed in the above figures, placing the packing 9 on the IC device 1, and adhering the packings 8 and 9.

In summary, it will be seen that the present invention provides a tag device having antennas and an IC device electrically connected together by capacitors each being constituted by an antenna terminal and an electrode plate. This kind of tag device is substantially free from faults ascribable to defective connection and is highly durable and reliable. Further, the tag device is produced by a procedure not including wire bonding needing accuracy, so that the production line for the tag device is simple.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A tag device having a generally flat IC (Integrated Circuit) device including a response circuit for storing information and for outputting a signal based on said information, and an antenna, said tag device comprising:

a generally flat electrode plate positioned on a major surface of said IC device and connected to said response circuit; and a generally flat antenna terminal connected to said antenna and facing said electrode plate at a preselected distance.

2. A tag device in accordance with claim 1, wherein said electrode plate comprises one of an electrically conductive semiconductor layer and an aluminum layer.

3. A tag device in accordance with claim 1, wherein said antenna terminal is formed of a same material as and integrally with said antenna.

4. A tag device in accordance with claim 1, wherein said antenna terminal is formed of one of aluminum, copper, and tungsten.

5. A tag device in accordance with claim 1, further comprising an electrically insulating film intervening between said electrode plate and said antenna terminal and covering said electrode plate.

6. A tag device in accordance with claim 5, wherein said insulting film is formed of at least one of a silicon oxide film and a silicon nitride film.

7. A tag device in accordance with claim 1, further comprising a dielectric layer intervening between said electrode plate and said antenna terminal.

8. A tag device in accordance with claim 1, wherein said electrode plate is used to input a signal to said response circuit while said antenna is used to receive an electromagnetic wave, and wherein the signal received by said antenna is routed through said antenna terminal and said electrode plate to said response circuit.

9. A tag device in accordance with claim 1, wherein said electrode plate is used to output a signal fed from said response circuit while said antenna is used to transmit an electromagnetic wave, and wherein the signal output from said response circuit via said electrode plate is routed through said antenna terminal to said antenna.

10. A tag device in accordance with claim 1, wherein said electrode plate is used to selectively input a signal to said response circuit or output a signal fed from said response circuit while said antenna is used to selectively transmit or receive an electromagnetic wave, wherein a signal received by said antenna is routed through said antenna terminal and said electrode plate to said response circuit, and wherein a signal output from said response circuit via said electrode plate is routed through said antenna terminal to said antenna.

11. A tag device in accordance with claim 1, wherein said electrode plate comprises a first and a second electrode plate respectively formed on opposite major surfaces of a substrate of said IC device, and wherein said antenna terminal comprises a first antenna terminal facing said first electrode plate at a preselected distance, and a second antenna terminal facing said second terminal at a preselected distance.

12. A tag device in accordance with claim 1, wherein said response circuit transmits, in response to an electromagnetic wave received from an interrogator, the signal based on the information stored in said response circuit via said antenna.

* * * * *